Figure 1:
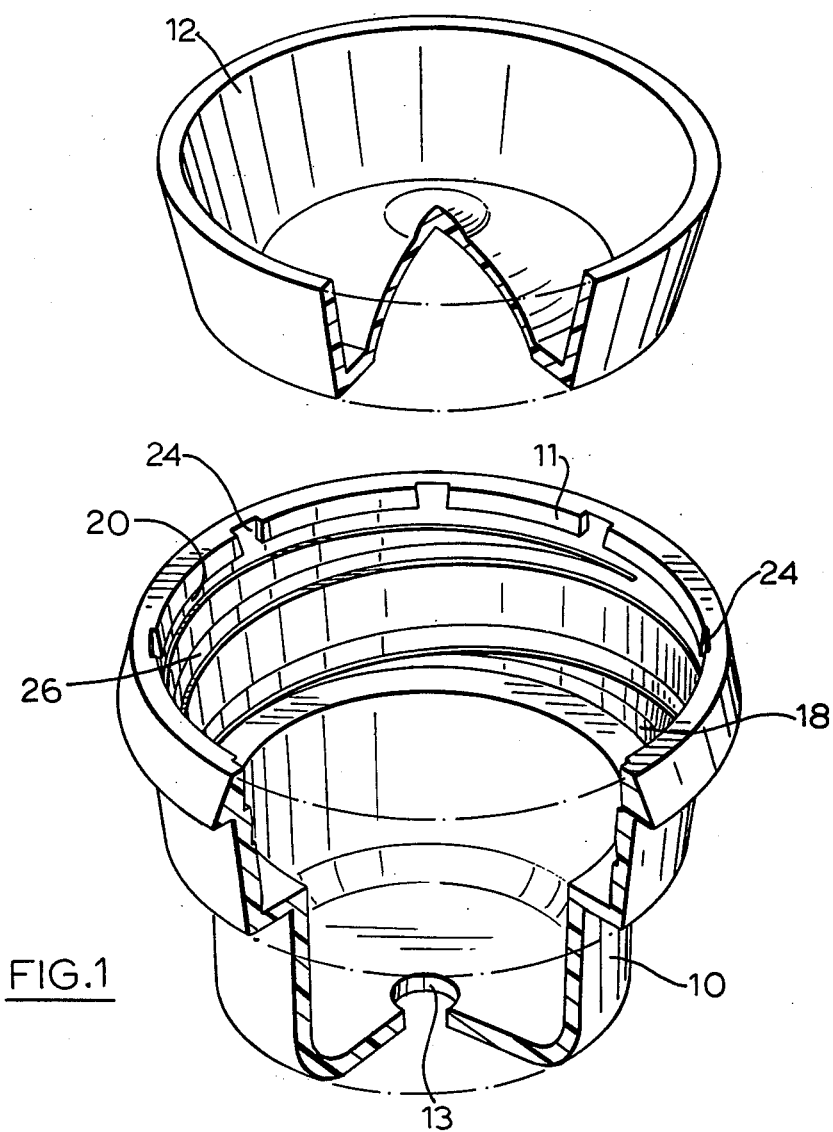

United States Patent [19]

Claxton

[11] 4,107,399
[45] Aug. 15, 1978

[54] VENTED CAP FOR STORAGE BATTERY

[75] Inventor: Joseph Edmund Claxton, Aurora, Canada

[73] Assignee: Somerville Belkin Industries Limited, London, Canada

[21] Appl. No.: 852,461

[22] Filed: Nov. 17, 1977

[51] Int. Cl.² .............................................. H01M 2/12
[52] U.S. Cl. ..................................................... 429/89
[58] Field of Search ............................. 429/82, 86, 89

[56] References Cited

U.S. PATENT DOCUMENTS 3,992,226  11/1976  Godshalk ............................... 429/89

FOREIGN PATENT DOCUMENTS 834,245  11/1938  France ...................................... 429/89

Primary Examiner—Donald L. Walton
Attorney, Agent, or Firm—Fetherstonhaugh & Co.

[57] ABSTRACT

A battery vent cap provided with a portion having sufficient length and having a venting passageway with a small cross-section to arrest or retard the passage of flame.

6 Claims, 2 Drawing Figures

U.S. Patent

Aug. 15, 1978

4,107,399

VENTED CAP FOR STORAGE BATTERY

This invention relates to a vented cap for a wet cell battery.

It is common to provide ventilated caps for the cells of wet cell storage batteries of the type used for automobile and other engine ignition. Ventilation is necessary because the chemical reaction taking place within the battery produces a gas that must be ventilated from the battery. Ventilation of these batteries, however, poses a very serious explosion problem in the event of fire. Flame at the exterior of the battery can penetrate through the ventilating opening of the cap to the cell and cause a violent explosion. It is known that the entrance of the flame of a fire to the interior of a battery cell can be avoided by providing a long ventilation passage. The length of passage can be designed to arrest the flame and prevent it from entering the battery cell and causing an explosion.

Many fire safe designs for ventilated caps for wet cell batteries have been devised. These caps involve a body and a cover for the body which between them define a devious ventilation passage that arrests the penetration of the flame. Prior proposals have been expensive to manufacture because of the manufacturing tolerances necessary for the purpose of controlling the size of the flame arresting ventilation passage. With most of the designs the body and the cover for the body which between them define the devious flame arresting and gas ventilation passage must be fused together. They are too costly to manufacture and have not been widely adopted.

This invention makes it possible to assemble the cover and the body with a snap-in type of fit and at the same time to achieve a ventilation passage between the body and the cover that has a devious flame arresting and gas ventilation section. The ventilated cap of this invention is very much more inexpensive than those of the prior art and will make the safety feature of a ventilation passage with a flame arresting and gas ventilation section generally available at a price that can be afforded by the industry.

A ventilated cap for a wet cell battery according to this invention has two pieces in close communication with each other over an interface that includes a frustoconical section that extends axially of the cap and that is close enough to retard the passage of flame, said pieces being formed with a ventilation passage between them that extends across said frustoconical section of said interface, said ventilation passage at said frustoconical section having a length to arrest passage of flame therethrough in use and cross-section to ventilate a battery cell in use.

Following is a description and drawing of an embodiment of the invention.

Figure 2:
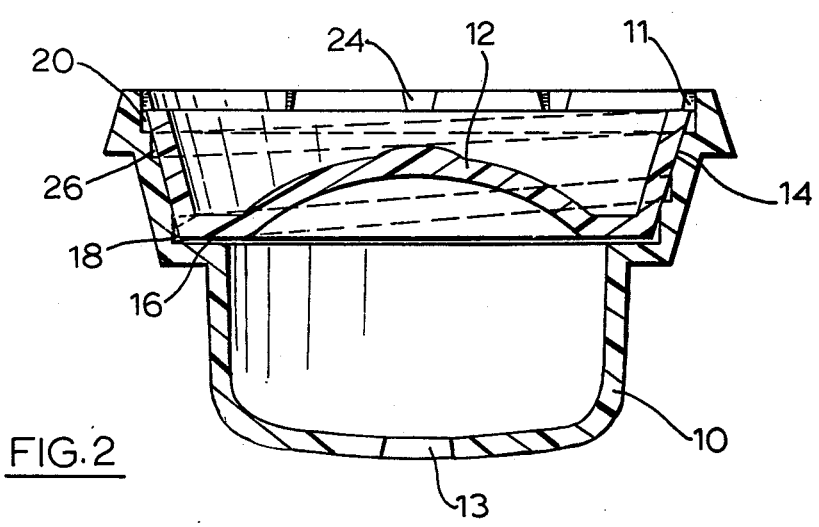

In the drawings:

FIG. 1 is an exploded perspective view, partly broken away, of a battery cap; and FIG. 2 is a sectional view of the cap of FIG. 1 in assembled position.

The ventilated battery cell cap illustrated in the drawings comprises an open cupped body 10 and a cover 12 therefor. These parts are preferably made from polypropylene and are injection molded but other materials and methods of manufacture are possible. The cover 12 nests in the cup 10 over an interface that includes an axially extending frustoconical portion 14 and a transversely extending portion 16. An inner annular header 18 for gas extends around the cup portion and an outer annular header 20 extends around the cup portion. The inner header 18 communicates with the interior of the cupped body 10 through a clearance space of about 0.010 of an inch in depth at the transversely extending portion 16 of the interface between the body and the cover. The outer header 20 communicates with the exterior or the cap through spaced apart notches 24 in the inwardly directed shoulder at the top of the cupped body. The passages from the interior of the cup to the header 18 and from the exterior of the cup to the header 20 are of ample capacity to provide easy ventilation to the respective headers.

Of importance is the devious flame arresting and gas ventilation section of the ventilation passage that extends across the interface 14 between the frustoconical surfaces of the body and cover. This portion of the ventilation passage comprises a helical groove 26 formed in the conical portion of the inside wall of the body 10 of the cap. The dimensions of the groove can be closely controlled and it is designed to have a length that will arrest a flame on the outside of the cap from passing therethrough to enter the inside of the cap. It is also designed to have a cross-section large enough to accommodate the ventilation requirements of the cap. There is a further requirement of the design of the interface at the frustoconical sections apart from the groove 26. It must be close enough that a flame existant at the outer extremity thereof cannot pas down the interface to the inner extremity thereof. Thus, the clearance at the frustoconical section of the interface must be small enough to be flame retardant.

The cross-sectional area of the passage 26 is a function of the length of the passage in any given design. In the embodiment of the invention illustrated the passage 26 has a vertical dimension of about 0.040 inches and a horizontal dimension of about 0.10 inches at its base. The length and cross-sectional area of a passage for fire arresting is a matter of trial in a particular case. Generally speaking, the longer the passage the greater the fire retarding qualities and it is a matter of specification and design safety factors required that determine the length of the fire retarding passage in a particular application. The design of fire retarding passages from length point of view is well known and not particularly part of this invention except that it will be noted that the spiral nature of the passage makes it possible to achieve good length in a small space.

The cross-section of the passage 26 must, of course, be small enough to prevent fire from passing therethrough but it must also be large enough to permit the ventilation of the gases that are normally emitted from the wet cell. In the normal automobile wet cell battery the general requirement of a ventilation passage is that it must allow gas escapement at a rate of between 3 and 6 cubic feet per hour at 2 pounds per square inch gauge of air. This is a safety requirement and may well change from time to time. In any event, the design requirement for gas escapement must be complied with and the length of the passage must be sufficient to achieve flame arrest. These are easily satisfied with this invention.

The clearance at the frustoconical interface between the body and the cap must be small enough to retard the passage of a flame directly down the interface to the interior of the cap. It is not necessary that it be small enough to prevent the escape of all ventilating gas across the interface, but there is a difference between preventing some gas escape and between being so large as to permit the transmission of a flame directly down the interface.

The achievement of an interface between the body and cover that is sufficiently close to prevent the passage of a flame with a construction wherein the cover can be simply projected onto the body and secured thereto by means of a snap fit has not previously been possible. It is achieved with this invention by providing for the interface between the body and the cover over a frustoconical section.

In the drawings, the upper edge of the cover 12 is projected into the body 10 and as it is projected the walls spring inwardly as they ride over the inwardly projecting shoulder 11 of the body. Once past the lower extremity of the shoulder they reassert themselves to assume the position illustrated in FIG. 2 of the drawings. In order to achieve a satisfactory snap-in fit a manufacturing tolerance of about 5/1000 of an inch in the vertical direction is necessary. However, a variation of 5/1000 of an inch in the clearance at the frustoconical section of the interface between the two members would not be permissable because a clearance of, say, 5/1000 of an inch at this interface would permit the passage of a flame directly downwardly across the interface. A variation of 0.005 of an inch in the vertical direction only results in a variation of 1/1000 of an inch in the transverse direction at the interface 14. This is because of the frustoconical disposition of the interface. The angle of the interface in the embodiment of the invention illustrated is about 15° from the longitudinal axis of the cup.

The horizontal portion of the interface 16 is designed with a large clearance. It is in the neighbourhood of 0.010 of an inch. Such a clearance would not arrest a flame, but the purpose of this portion of the interface is merely to provide ample communication between the inside of the cap and the header 18. Similarly, the openings 24 in the inwardly directed shoulder of the cup are large and not in any way intended to be flame arresting. Their principle purpose is to provide communication to the header 20. The flame retarding aspect of the ventilation passage is defined between the components at the frustoconical portion of the interface.

The permissible clearance at the interface will obviously depend upon the dimension of the device. If the frustoconical interface is relatively shallow a closer spacing between the two members is necessary to arrest flame. If on the other hand it is deeper, a greater spacing cn be accepted. With an interface of the design illustrated and having a length of about 0.24 inches a spacing between the two of about 0.001 to 0.002 inches is satisfactory to arrest flame. This, as noted above can be easily achieved with practical manufacturing tolerances for the two parts.

Numeral 13 is the usual opening from the interior of the cap to the exterior of the cap at the inside of the battery cell.

As indicated the parts for this invention can be mass produced on injection molding equipment from polypropylene with standard injection molding techniques and well constructed molds where all cavitites and cores are in close tolerance relation to each other and the wide range of shrinkage factors obtainable with polypropylene (0.010 to 0.025 per inch). Diametrical dimensions for fit requirements between the body and cover can be very easily obtained by adjusting the molding conditions at the molding machine in accordance with usual molding practice.

Embodiments of the invention other than the one illustrated will be apparent to those skilled in the art. The portion of the ventilating path across the frustoconical interface, for example, need not be of the helical nature illustrated. One could, for example, provide more than two annular headers similar to the headers 18 and 20 which would be spaced apart along the height of the interface and interconnect the headers by axially extending passages that do not align with each other from one header to the next. The important feature of the invention that permits the parts to be manufactured on a mass production basis and with a manufacturing tolerance that will permit the projection of one part onto the other is an interface that has a frustoconical portion that extends axially of the body and the ventilation passage between the body and the cover that has a devious flame arresting and gas ventilation section that extends across the frustoconical interface. The flame arresting and gas ventilating section being defined by the body and cover at the frustoconical section and having a length that arrests the passage of flame thereto in use and a cross-section large enough to provide ventilation for the body. The clearance at the interface apart from the passage thereacross being small enough to arrest flame.

From the foregoing it will be apparent that the cover 12 can be simply projected onto the cup and once in place it is locked against removal. While this simple snap-in type of assembly is to be preferred because it does not invole the use of cements or welding it is not intended to restrict the invention to this structure. Many modifications to the invention will be apparent to those skilled in the art and it is not intended that the foregoing description should be read in a limiting sense.

In use the cap is used to close the open wet cells of an automobile of like storage battery and provides ventilation therefor through the passages described.

What I claim as my invention is:

1. A vented cap for a wet cell battery comprising:
a body adapted to form a closure for an opening of a wet cell battery and having an opening therethrough;
a cover for said body;
said cover nesting in said body over an interface;
said interface having a frustoconical portion that extends axially of said body;
a ventilation passage between said body and said cover through said cap, said ventilation passage having a devious flame arresting and gas ventilation section that extends across said interface, said devious flame arresting and gas ventilation section of said passage being defined by said body and said cover at said frustoconical portion of the interface and having a length to arrest passage of flame therethrough in use, and a cross-section large enough to provide ventilation for the battery cell;
said body and said cover having a clearance at said interface apart from said devious flame arresting and gas ventilation section small enough to retard the passage of flame.

2. A vented cap for a wet cell battery as claimed in claim 1 wherein said body and said cover are made from a resilient plastics material, said cover being projectable onto said body to a snap-in type fit locked against removal.

3. A vented cap for a wet cell battery as claimed in claim 1 wherein said body is cup shapped and has a vent opening in the bottom thereof, said ventilation passage extending from the interior of said cup to the exterior of said cup.

4. A vented cap for a wet cell battery comprising:
- a cup-shaped body having a frustoconical inside surface adjacent its upper edge and a ventilation opening in its bottom;
- a cover for said body having an outer frustoconical surface to compliment the frustoconical surface of said body and in close relation thereto;
- a ventilation passage from the interior of said cup to the exterior of said cup that has a devious flame arresting and gas ventilation section that extends across the interface between said cup and said cover at their said respective frustoconical surfaces;
- said devious flame arresting and gas ventilation section of said passage having a length to arrest passage of a flame therethrough in use and a cross-section large enough to provide ventilation for a battery cell;
- said cover being in close relation to said cup at said frustoconical section as aforesaid apart from said devious flame arresting and gas ventilation section to retard passage of flame.

5. A vented cap for a wet cell battery as claimed in claim 4 in which said cover is projectable onto said cup to a snap-in type fit locked against removal.

6. A vented two piece cap for a wet cell battery comprising:
- two pieces in close communication with each other over an interface that includes a frustoconical section that extends axially of the cap and that is close enough to retard the passage of flame;
- said pieces being formed with a ventilation passage between them that extends across said frustoconical section of said interface, said ventilation passage at said frustoconical section having a length to arrest passage to flame therethrough in use and cross-section to ventilate a battery cell in use.

* * * * *